(12) United States Patent
Thomas et al.

(10) Patent No.: US 7,406,600 B2
(45) Date of Patent: Jul. 29, 2008

(54) ERROR-DETECTABLE LICENSE KEY FRAGMENTATION TO FACILITATE ERRORLESS MANUAL ENTRY

(75) Inventors: William J. Thomas, Carmichael, CA (US); Kenneth J. Geer, Auburn, CA (US); Chris D. Hyser, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 718 days.

(21) Appl. No.: 10/630,144

(22) Filed: Jul. 30, 2003

(65) Prior Publication Data

US 2005/0028064 A1    Feb. 3, 2005

(51) Int. Cl.
   *H04L 9/00*    (2006.01)
(52) U.S. Cl. .......................... 713/181; 380/44; 714/752
(58) Field of Classification Search ................... 380/44; 713/181, 184, 168; 714/752
   See application file for complete search history.

(56) References Cited

U.S. PATENT DOCUMENTS

| | | | |
|---|---|---|---|
| 6,657,625 B1 * | 12/2003 | Chik et al. ................. | 345/467 |
| 6,687,836 B1 * | 2/2004 | Butler ........................... | 726/7 |
| 7,028,192 B2 * | 4/2006 | Butler ........................ | 713/183 |
| 2002/0051537 A1 * | 5/2002 | Rogaway ..................... | 380/46 |
| 2002/0071552 A1 * | 6/2002 | Rogaway ..................... | 380/37 |
| 2003/0105959 A1 * | 6/2003 | Matyas et al. ............... | 713/168 |
| 2003/0182614 A1 * | 9/2003 | Schroeder ................... | 714/776 |

* cited by examiner

*Primary Examiner*—Gilberto Barron, Jr.
*Assistant Examiner*—Samson B Lemma

(57) ABSTRACT

A key fragment generator accepts a key string, such as from a key string generator, and produces a plurality of key fragments that can be entered by a human with a lower likelihood of error than if the human attempted to enter the original key string. A key defragmenter accepts a plurality of entered key fragments, reconstitutes the original key string from the entered key fragments and, optionally, provides the reconstituted key string to a software package or other license manager. The key fragment generator can produce "friendly" key fragments that are easier for humans to read and enter than the arbitrary character strings that characterize typical key strings. The key fragment generator can produce "error-detectable" key fragments. If an error-detectable key fragment is entered incorrectly, the key defragmenter can generate an error message and permit a user to enter the key fragment again. The key fragment generator can produce "error-correctable" key fragments. If an error-correctable key fragment is entered incorrectly, the key defragmenter can generate an error message that describes the nature of the error or that draws a user's attention to a portion of the key fragment that the user entered incorrectly. The error message can include a "hint" related to one or more confusable characters that were entered incorrectly.

50 Claims, 10 Drawing Sheets

ERROR-DETECTABLE LICENSE KEY FRAGMENTATION TO FACILITATE ERRORLESS MANUAL ENTRY

BACKGROUND

1. Field of the Invention

The present invention relates generally to processing key strings used to license software or hardware and, more particularly, to segmenting such license keys to facilitate errorless manual entry of such key strings.

2. Related Art

Many software packages such as operating systems and application programs are licensed by suppliers to end-users for use on one or more licensed computers or by one or more users. To prevent unlicensed use, a typical licensed software package is designed to require a potential user to enter a valid license key during installation or activation of the software package. Without entry of the valid license key, the software package will either not properly install or not operate.

A typical license key comprises a relatively long string of characters, often more than 20 characters in length. Suppliers typically use automated systems to generate a unique key string for each unit of each software package they produce. The unique key string is usually printed on a piece of paper, which is then included with each unit of the corresponding software package. Other times, the user obtains the key string via an e-commerce web site. To install or activate the software package, the user must read and correctly enter the key string using a keyboard.

Key strings often include encrypted information that software packages use to verify the validity of the entered key strings. Consequently, the key strings appear to contain random or nonsense characters from the perspective of the user. Many users have difficulty correctly entering such long, nonsensical strings of characters.

SUMMARY OF THE INVENTION

In one aspect of the invention, a method for using a plurality of error-detectable key fragments of an original license key string is disclosed. The method comprises: fragmenting the original key string into a plurality of key fragments; and calculating, for each key fragment, corresponding check data; and combining each key fragment with its corresponding check data to form said error-detectable key fragments.

In another aspect of the invention, a method of segmenting a license key string into a plurality of error-correctable key fragments is disclosed. The method comprises: fragmenting the key string into a plurality of key fragments; and calculating, for each key fragment, corresponding error-correction data; and combining each key fragment with said corresponding error-correction data to for a plurality of error-correctable key fragments. The error-correction data permits the identification of errors in said error-correctable key fragments.

In yet another aspect of the invention, an article of manufacture is disclosed. The article of manufacture comprises a computer-readable medium storing computer-executable instructions capable of segmenting a key string into a plurality of error-detectable key fragments, comprising: fragmentating the original key string into a plurality of key fragments; and calculating, for each key fragment, corresponding check data; and combining each key fragment with its corresponding check data to form said error-detectable key fragments.

In a further aspect of the invention, an article of manufacture is disclosed. The article of manufacture comprises: a computer-readable medium storing computer-executable instructions capable of segmenting a key string into a plurality of error-detectable key fragments, comprising: fragmenting the key string into a plurality of key fragments; calculating, for each key fragment, corresponding error-correction data; and combining each key fragment with said corresponding error-correction data to for a plurality of error-correctable key fragments, wherein said error-correction data permits the identification of errors in said error-correctable key fragments.

In yet a further aspect of the invention, a key fragment generator for segmenting a key string into a plurality of error-detectable key fragments is disclosed. The key fragment generator comprises: a key fragmenter adapted to input the key string and produce key fragments; a check data generator configured to calculate check data corresponding to the key fragments, wherein the check data can be subsequently used to detect if the corresponding key fragment is entered incorrectly; and a combiner configured to combine the key fragments and the corresponding check data to provide the plurality of error-detectable key fragments.

In another aspect of the invention, a key defragmenter for combining a plurality of entered error-detectable key fragments into a reconstituted key string is disclosed. Each error-detectable key fragment comprises key data and check data. The claimed key defragmenter comprises: an error checker adapted to use the check data of at least one of the entered error-detectable key fragments to detect if the entered error-detectable key fragment is entered incorrectly; and an accumulator adapted to defragment the key data of the entered error-detectable key fragments into the reconstituted key string and provide the reconstituted key string.

In yet another aspect of the invention, a key defragmenter for combining a plurality of entered friendly key fragments into a reconstituted key string is disclosed. The key defragmenter comprises: a friendly fragment converter adapted to ascertain a key fragment, from which the entered friendly key fragment was calculated; and an accumulator adapted to defragment the ascertained key fragments into the reconstituted key string and to provide externally said reconstituted key string.

In a further aspect of the invention, a key fragment generator for segmenting a key string into a plurality of error-correctable key fragments is disclosed. The key fragment generator comprises a key fragmenter configured to fragment the original key string into a plurality of key fragments; an error correction module configured to calculate error correction data corresponding to each key fragment, wherein error correction data can subsequently be used to determine the accuracy of the corresponding key data; and a combiner configured to combine each key fragments with its corresponding error correction data to provide the plurality of error-correctable key fragments.

In yet a further aspect of the invention, a licensing key defragmenter for combining a plurality of entered error-correctable key fragments into a reconstituted key string, each error-correctable key fragment comprising key data and error correction data, is disclosed. The key defragmenter comprises: an error correction module configured to use the error correction data to identify a portion of the entered error-correctable key fragment that was entered incorrectly; and an accumulator adapted to defragment the key data of the entered error-detectable key fragments into the reconstituted key string and to provide the reconstituted key string.

In yet a further aspect of the invention, a key fragment error detector for detecting an error in an entered licensing key fragment. The licensing key fragment comprising key data and error correction data, and the error detector comprises: an error correction module configured to utilize the error correction data to determine whether the entered licensing key fragment has been correctly entered; and an error message generator configured to provide to a user interface a message that identifies a portion of the entered key fragment that was entered incorrectly.

DETAILED DESCRIPTION

The present invention is directed to methods and systems for segmenting a license key string to produce a plurality of key string fragments (hereinafter "key fragments") that can be entered by a human with a lower likelihood of error than if a human attempted to enter the original key string. The key string fragments are error-detectable; that is, each key fragment includes error detection data that enables the present invention to verify accurate manual entry by the user. Preferably, the key string fragments are also "friendly." Friendly key fragments comprise words or other character strings that are easier for humans to read, recall and enter into a user interface, as compared with the arbitrary character strings comprising conventional license key strings. In addition to fragmentation, the present invention also performs defragmentation of received license key fragments. Here, the invention accepts a plurality of entered key fragments, reconstitutes the original key string from the entered key fragments and, optionally, provides the reconstituted/original key string to hardware or to a software package. Preferably, the key fragments are each shorter than the original key string. Some embodiments permit a user to enter each such key fragment separately, verifying the accuracy of each such key string fragment as it is entered by the user. Preferably, such embodiments also identify incorrectly-entered key fragments, enabling the user to reenter such improperly entered key fragment(s). Optionally, the present invention generates a message describing the nature of the error or identifying a portion of the key fragment that the user entered incorrectly. Such an approach eliminates the requirement that a user correctly enter an entire license key string at one time and without error.

Figure 1:
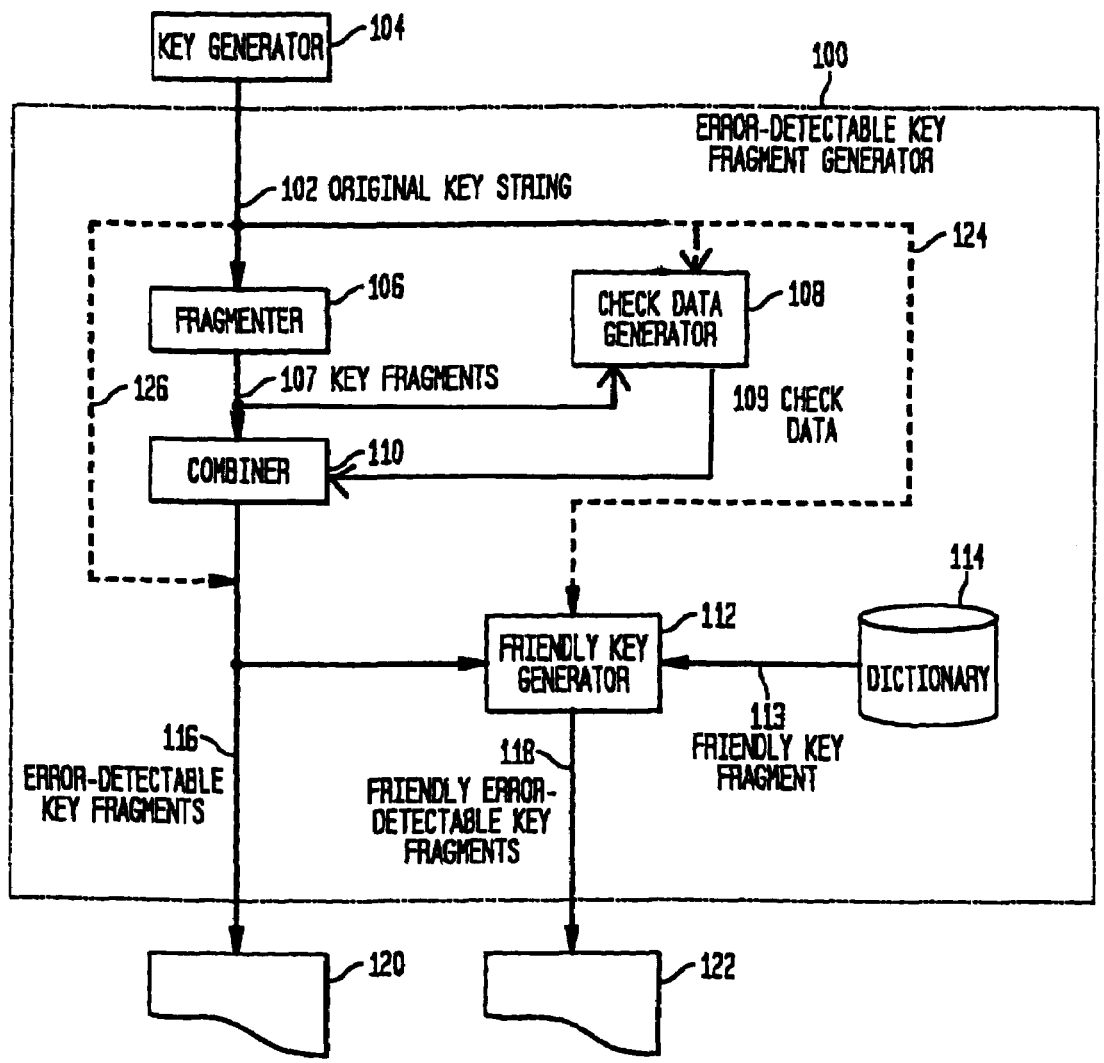
FIG. 1 is a block diagram of an exemplary error-detectable key fragment generator in accordance with one embodiment of the present invention.

FIG. 1 is a block diagram of an exemplary error-detectable key fragment generator in accordance with one embodiment of the present invention. Key fragment generator 100 receives an original license key string 102 and generates error-detectable key fragments 116 and/or friendly error-detectable key fragments 118. Original key string 102 can be received from any number of sources, as is well known in the art. In the embodiment illustrated in FIG. 1, key fragment generator 100 is shown communicably coupled to a key generator 104 that generates original key string 102. In one embodiment, key generator 104 is connected to key fragment generator 100 by a hardware or software connection. For example, in one particular embodiment, key generator 104 and key fragment generator 100 each comprise software program(s) that are executed on a common computer, or on separate computers that are interconnected via a network. Key generator 104 and error-detectable key fragment generator 100 can use, for example, an application programming interface ("API") to communicate with each other. Alternatively, key generator 104 can store original key string 102 on a computer-readable medium that is subsequently read by key fragment generator 100. Further, key fragment generator 100 can be part of key generator 104 or they can be separate software components.

Error-detectable key fragment generator 100 includes a fragmenter 106, a check data generator 108, a combiner 110, a friendly key generator 112 and a dictionary 114. Error-detectable key fragment generator 100 is shown producing two human-readable outputs: a plurality of error-detectable key fragments 116 and a plurality of friendly error-detectable key fragments 118, although embodiments can produce one or both of these outputs. These outputs can be provided in printed form, as shown at 120 and 122 of FIG. 1, or on a display device or on a computer-readable medium (not shown). The components of key fragment generator 100 as well as error-detectable key fragments 116 and 118 are described in detail below with reference to FIGS. 3 and 4.

Figure 3:
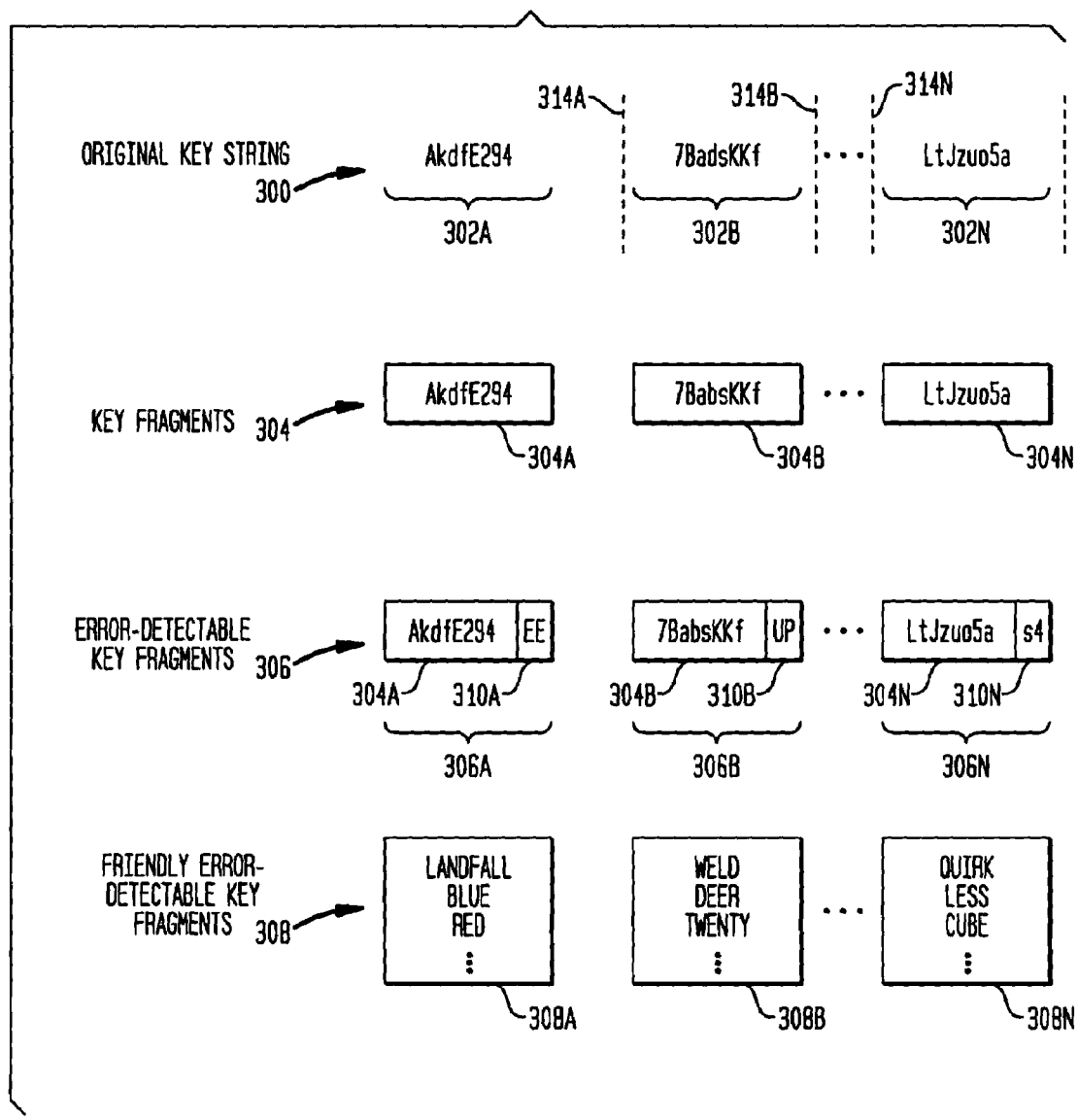
FIG. 3 is a diagram showing how an exemplary key string can be segmented into a plurality of error-detectable key fragments in accordance with one embodiment of the present invention.
Figure 4:
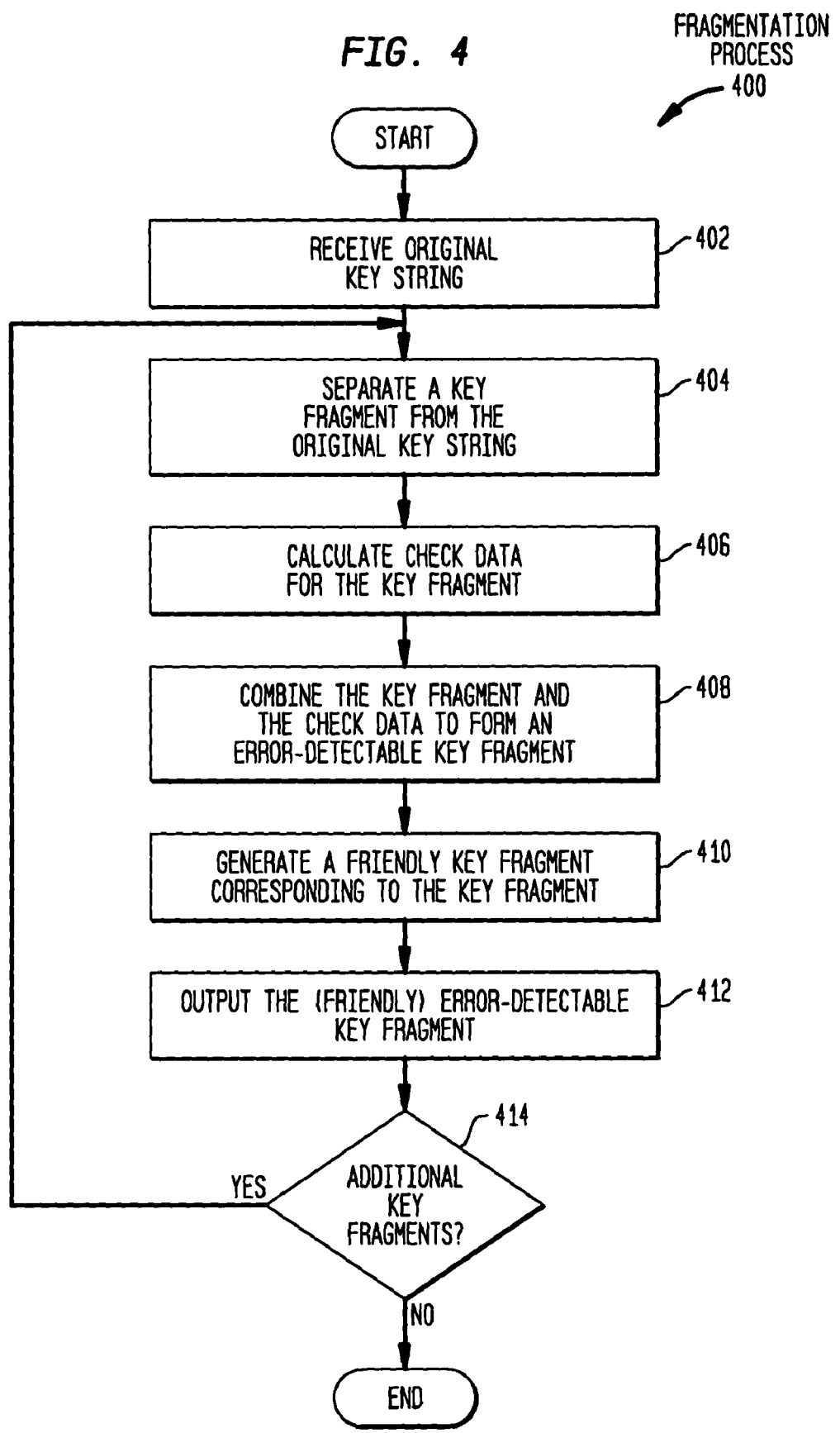
FIG. 4 is a flowchart of the operations performed by one embodiment of an error-detectable key fragment generator to segment an original key string into a plurality of error-detectable key fragments.

FIG. 3 shows an exemplary key string fragmentation. FIG. 4 is a flowchart illustrating an exemplary set of operations that can be performed by error-detectable key fragment generator 100 to segment an original key string 102 into a plurality of error-detectable key fragments 116, 118. It should be appreciated that fragmentation process 400 is one exemplary process, the present invention is not limited to this exemplary set of operations, individual steps or the sequence in which the steps are presented herein.

At block 402, key fragment generator 100 (FIG. 1) receives original key string 102 from, in this example, key generator 104. In the fragmentation example illustrated in FIG. 3, original key string 300 is provided as an exemplary original key string 102. Original key string 300 includes a series of characters described below.

At block 404, a first string of characters is separated from original key string 102 to form the first of a plurality of key fragments 107. As shown by dash lines 314A-314N in FIG. 3, original key string 300 is segmented into shorter substrings 302A, 302B, . . . 302N. Key fragments 304A, 304B, . . . 304N are produced from substrings 302A, 302B, . . . 302N, respectively, as shown in FIG. 3. Preferably, the length of the segmented strings (302 in FIG. 3) is selected such that the corresponding key fragment 107 (304 in the example of FIG. 3) is short enough for a human to remember. In one embodiment, key fragments 107 are shorter than 11 characters in length. In an alternative embodiment, key fragments 107 are seven characters or less in length. Other lengths suitable for the particular application and user profile can also be implemented.

In the example key fragmentation illustrated in FIG. 3, key fragments 304 are segmented from original key string 300 in contiguous portions. As one of ordinary skill in the art would appreciate, however, original key string 102 can be fragmented in other ways. For example, every fifth character of a 40-character original key string 102 can be extracted, and these characters can be combined to form one of five, eight-character key fragments 107. Further, one of ordinary skill in the art will appreciate that key fragments 107 need not all be the same length.

At block 406, check data generator 108 (FIG. 1) calculates check data 109 for each key fragment 107. For example, check data 109 can be a checksum or CRC. Other types of check data are utilized in alternative embodiments. Check data 109 can be used later to verify that key fragments 201 have been entered without error. This is described in further detail below.

At block 408, combiner 110 (FIG. 1) combines key fragment 107 and its corresponding check data 109 to produce error-detectable key fragment 116. In one embodiment, check data 109 is appended to key fragment 107 to form error-detectable key fragment 116. In alternative embodiments, check data 109 can appear elsewhere in error-detectable key fragment 116. Furthermore, combiner 110 need not simply concatenate key fragment 107 and check data 109. For example, combiner 110 can combine key fragment 107 and check data 109 using any applicable mathematical, mapping or other algorithm.

Referring to the example illustrated in FIG. 3, check data generator 108 receives key fragments 304A-N and for each such key fragment 304, generates check data 310A-N. In this illustrative example, combiner 110 concatenate key fragments 304 and corresponding check data 310 to form error-detectable key fragments 306. For example, for key fragment 304A "Akdfe29u," check data generator 108 calculates check data 310A of "EE." Combiner 110 appends check data 310A to the end of key fragment 304A to form error-detectable key fragment 306A of "Akdfe29uEE."

Optionally, at block 410, friendly key generator 112 (FIG. 1) calculates or retrieves from dictionary 114 a friendly key fragment 113 corresponding to each error-detectable key fragment 116 generated by combiner 110. In the embodiment shown in FIG. 1, friendly key generator 112 accesses a dictionary 114 containing, for example, a plurality of words which serve as friendly key fragments 113. In one embodiment, friendly key generator 112 uses a binary value of error-detectable key fragment 116 as an index into dictionary 114 to retrieve friendly error-detectable key fragment 113. In this embodiment, dictionary 114 contains a plurality of word phrases. Alternatively, binary values of portions of error-detectable key fragment 116 can each be used as indexes into dictionary 114 to look up portions of friendly error-detectable key fragment 118. The retrieved portion can then be combined to form friendly error-detectable key fragment 118. For example, the binary value of each character or character-pair of error-detectable key fragment 116 can be used as an index into dictionary 114.

In an alternative embodiment, friendly key generator 112 can look up or generate multiple substrings for each friendly error-detectable key fragment 118, and combine the substrings to create friendly error-detectable key fragment 118. For example, friendly key generator 112 may generate or look-up one or more partial friendly key fragments. The one or more partial friendly key fragments may be based on, or generated from, key fragments 107 or check data 109. In these embodiments, the one or more partial friendly key fragments may be utilized along with error-detectable key fragments 116 to form friendly error-detectable key fragments 118. Alternatively, friendly key generator 112 can generate friendly error-detectable key fragments 118 using an algorithm, rather than dictionary 114. Regardless of whether friendly error-detectable key fragments 118 are retrieved or generated, the process should be reversible as described below. In the example illustrated in FIG. 3, exemplary friendly error-detectable key fragments 118 are shown as key fragments 308. The friendly key fragments 308A generated, for example, for error-detectable key fragment 306A "AkdfE294EE" are "landfall," "blue," and "red." It is anticipated that such key fragments 308A can be more accurately entered by a user as compared with key fragment 306A "AkdfE294EE."

In one alternative embodiment, friendly key generator 112 can generate friendly error-detectable key fragments 113 based on key fragments 107 rather than error-detectable key fragments 116. This approach is depicted in FIG. 1 by dashed line 124. In another alternative embodiment, key fragments 107 can be output without further processing by combiner 110, check data generator 108 or friendly key generator 112. Such an embodiment is depicted in FIG. 1 by dashed line 126. However, it should be understood that such embodiments are less preferred than other embodiments because they forego the error detectability feature described above.

At block 412, key fragment generator 100 outputs error-detectable key fragment 116 and/or the friendly error-detectable key fragment 118. At block 414, key fragment generator 100 ascertains whether there are more key fragments 107 to process; that is, whether the entire original key string 102 has been processed. If there are more key fragments 107 to process, key fragment generator 100 control returns to block 404 and the above steps are repeated. Otherwise, fragmentation process 400 completes at block 416. Upon completing its operations at block 416, key fragment generator 100 has provided a plurality of error-detectable key fragments 116 or a plurality of friendly error-detectable key fragments 118 in human-readable form.

Figure 2:
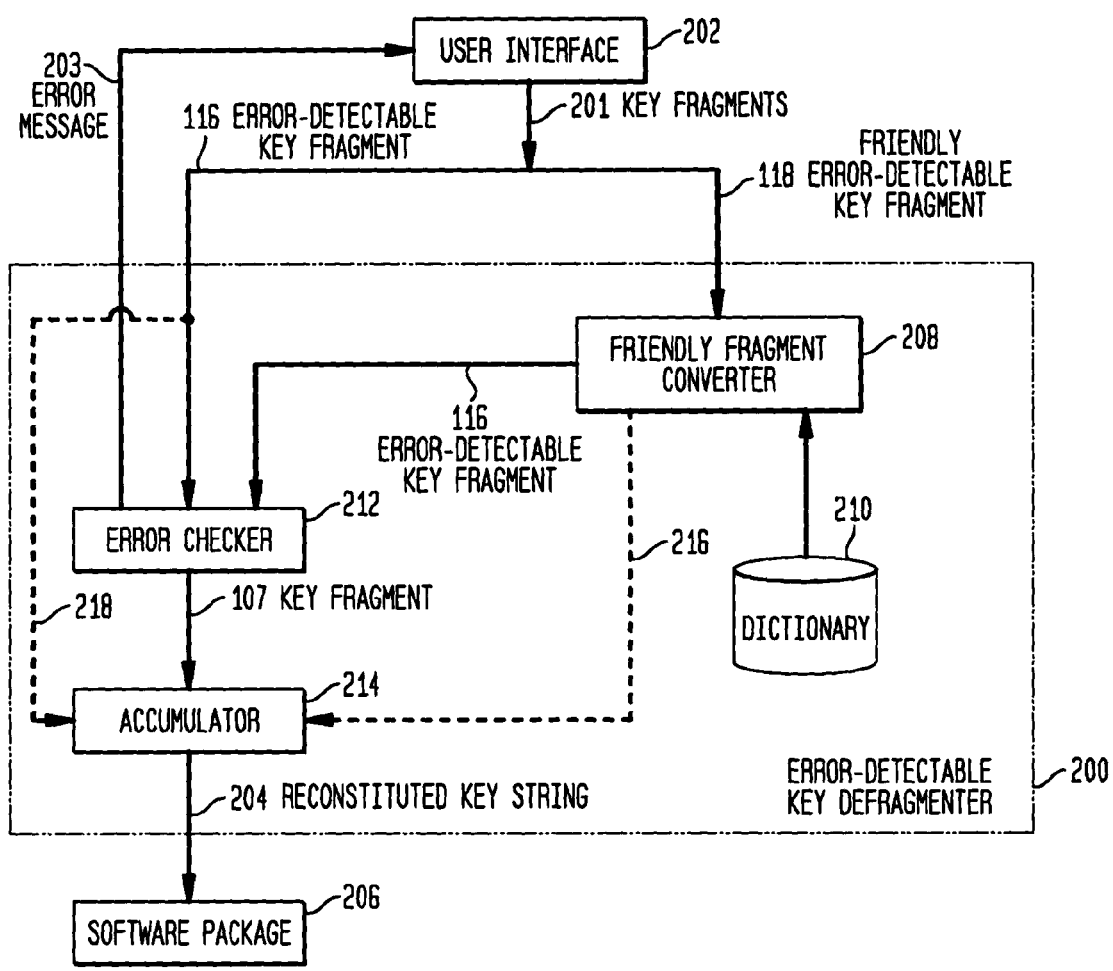
FIG. 2 is a block diagram of an exemplary error-detectable key defragmenter in accordance with one embodiment of the present invention.

FIG. 2 is a block diagram of an exemplary error-detectable key defragmenter 200 in accordance with one embodiment of the present invention. Error-detectable key defragmenter 200 is shown communicably coupled to a user interface 202 such as a keyboard, touch-screen, electronic writing tablet, voice-responsive software and the like. Error-detectable key defragmenter 200 receives user-entered key fragments 201 through input device 202. The received key fragments 201 can be error-detectable key fragments 116 or friendly error-detectable key fragments 118. Error-detectable key defragmenter 200 includes a friendly fragment converter 208, a dictionary 210, an error checker 212 and an accumulator 214. Error-detectable key defragmenter 200 generates a reconstituted key string 204 that is the same as original key string 102 when key fragments 201 have been accurately entered. In the exemplary application shown in FIG. 2, reconstituted key string 204 is provided to a software package 206. The components of key defragmenter 200 and reconstituted key 204 are described in detail below with reference to FIGS. 3 and 5.

Figure 5:
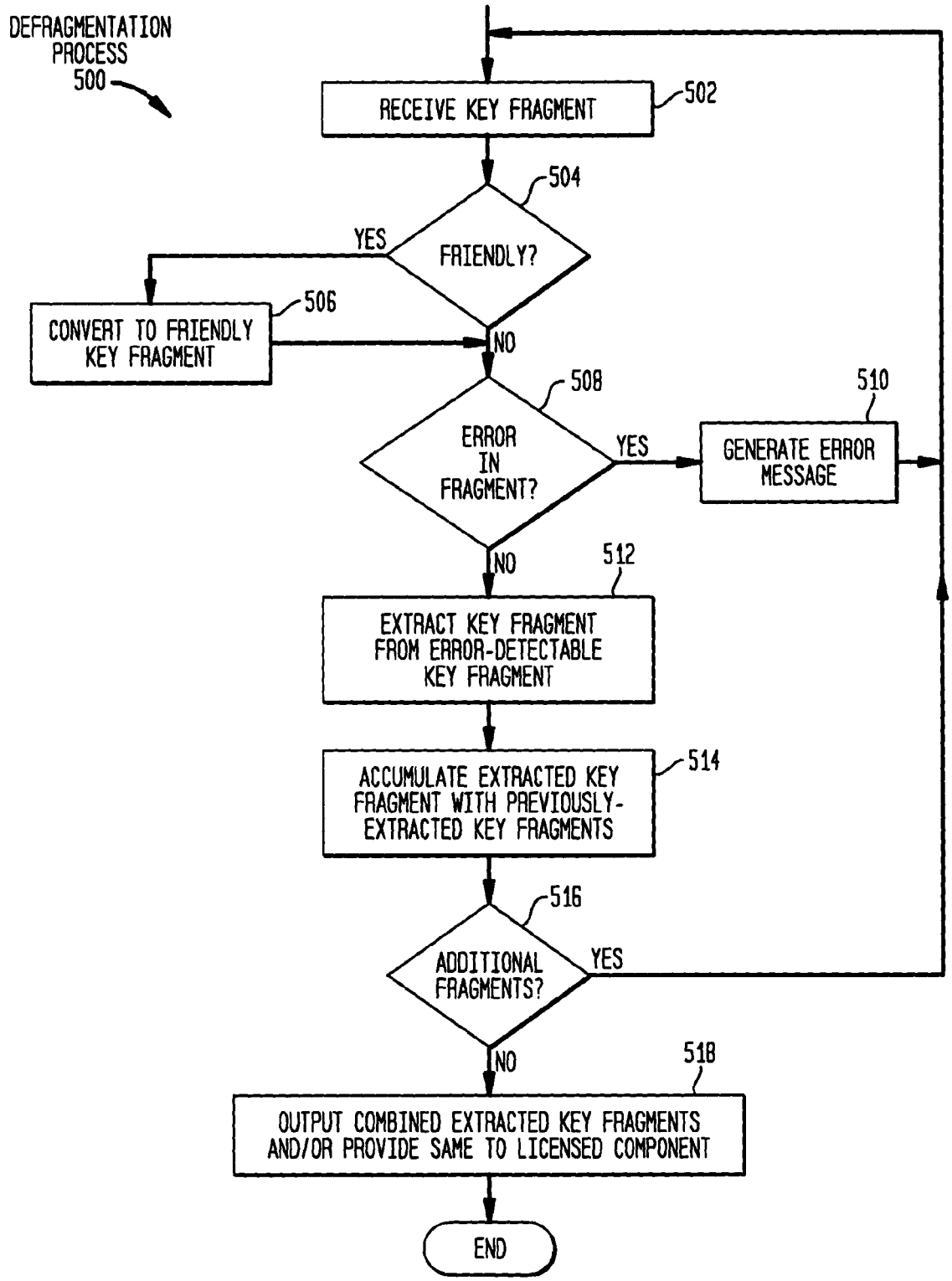
FIG. 5 is a flowchart of the operations performed by one embodiment of an error-detectable key defragmenter to combine a plurality of error-detectable key fragments into a reconstituted key string.

FIGS. 1 and 3 were introduced above. FIG. 5 is a flowchart illustrating exemplary steps that can be performed by error-detectable key defragmenter 200 to combine a plurality of manually entered error-detectable key fragments 201 into a reconstituted key string 204. It should be appreciated that defragmentation process 500 is one exemplary process and that the present invention is not limited to this exemplary set of operations, individual steps or the sequence in which the steps are presented herein.

At block 502, error-detectable key defragmenter 200 receives a key fragment 201. Key defragmenter 200 receives key fragment 201 through a user interface 202 such as any of those noted above. Inputted key fragment 201 is determined, at block 504, to be either an error-detectable key fragment 116 or a friendly error-detectable key fragment 118. If it is the latter, control passes to block 506; if it is the former, control passes to block 508. In FIG. 2, inputted key fragment 201 is shown as being either error-detectable key fragment 116 provided to error checker 212 (described below) or friendly error-detectable key fragment 118 provided to friendly fragment converter 208 (also described below). In the example shown in FIG. 3, inputted key string 201 could be either the exemplary error-detectable key fragments 306 or the exemplary friendly error-detectable key fragments 308.

At block 506, friendly fragment converter 208 converts inputted friendly error-detectable key fragment 118 into an error-detectable key fragment 116. In one embodiment, converter 208 references dictionary 210, essentially reversing the process performed by friendly key generator 112 (FIG. 1) described above. Alternatively, friendly fragment converter 208 can use an appropriate algorithm to reverse the process friendly key generator 112 used to calculate friendly key fragments 118. In the example shown in FIG. 3, friendly error-detectable key fragments 308A of "landfall," "blue," and "red" are converted by friendly fragment converter 208 to key fragment 306A of "AkdfE29uEE."

In certain embodiments, as noted above, friendly error-detectable key fragments 118 may be formed by friendly key generator 112 based on one or more partial friendly key fragments and error-detectable key fragments 116 to form friendly error-detectable key fragments 118. In these embodiments, friendly fragment converter 208 reverses the process performed by friendly key generator 208 by extracting error-detectable key fragments 116 from the friendly error-correctable key fragments 118.

At block 508, error checker 212 uses check data 109 in error-detectable key fragment 116 to ascertain whether the inputted key fragment 201 was entered correctly. As shown in FIG. 2, regardless of whether inputted key fragment 201 is an error-detectable key fragment 116 or a friendly error-detectable key fragment 118, error check 212 receives an error-detectable key fragment 116.

In the example shown in FIG. 3, error checker 212 uses check data 310A of "EE" extracted from error-detectable key fragments 306A of "AkdfE29uEE" to determine whether the remaining characters were entered correctly as key fragment 304A of "AkdfE29u." If key fragment 201 was not entered correctly, an error message 203 is output at block 510 and control passes back to block 502 to give the user an opportunity to enter the key fragment correctly.

If the key fragment was entered correctly, then at block 512 accumulator 214 to extracts key fragment 107 from error-detectable key fragment 116 and provides it to accumulator 214. In the example shown in FIG. 3, key fragment 304A of "AkdfE29u" is extracted from error-detectable key fragments 306A of "AkdfE29uEE" and provided to accumulator 214.

At block 514, accumulator 214 combines key fragment 107 with any previously extracted key fragment 106. Eventually, all extracted key fragments 107 will be combined to form reconstituted key string 204. In the example illustrated in FIG. 3, key fragments 304A ("AkdfE29u"), 304B ("7BadsKKf"), etc., are combined to form original key string 300 shown in FIG. 3.

Alternatively, as shown by dashed line 216 (FIG. 2), if friendly key generator 112 generated friendly error-detectable key fragments 118 based on key fragments 107 (as described above), rather than based on error-detectable key fragments 116, then friendly fragment converter 208 converts the inputted key fragments 201 and passes them directly to accumulator 214, bypassing error checker 212. Similarly, in another alternative embodiment, as shown by dashed line 218 (FIG. 2), if key fragments 107 were output by generator 100 without further processing (as described above), then error-detectable key defragmenter 200 passes inputted key fragments 201 directly to accumulator 214 without further processing.

At block 516, it is determined whether more key fragments 201 are to be processed. If so, control returns to block 502 and the above steps are repeated. Otherwise, control passes to block 518, where key defragmenter 200 outputs reconstituted key string 204 to, for example, a software package 206. In one embodiment, key defragmenter 200 simulates user inputs to software package 206. Alternatively, software package 206 can include an application programming interface (API) for the purpose of accepting reconstituted key string 304. Summarizing, key defragmenter 200 combines a plurality of entered error-detectable key fragments 116 or a plurality of friendly error-detectable key fragments 118 into a reconstituted key string 204.

As noted, in certain embodiments of the present invention an error message is generated when an error-correctable key fragment is entered incorrectly. In such embodiments, the error message may describe the nature of the error, draw the user's attention to a portion of the entered key fragment that the user entered incorrectly, or include further information such as suggestive corrective action. Such embodiments will now be described with reference to FIGS. 6-10.

Figure 6:
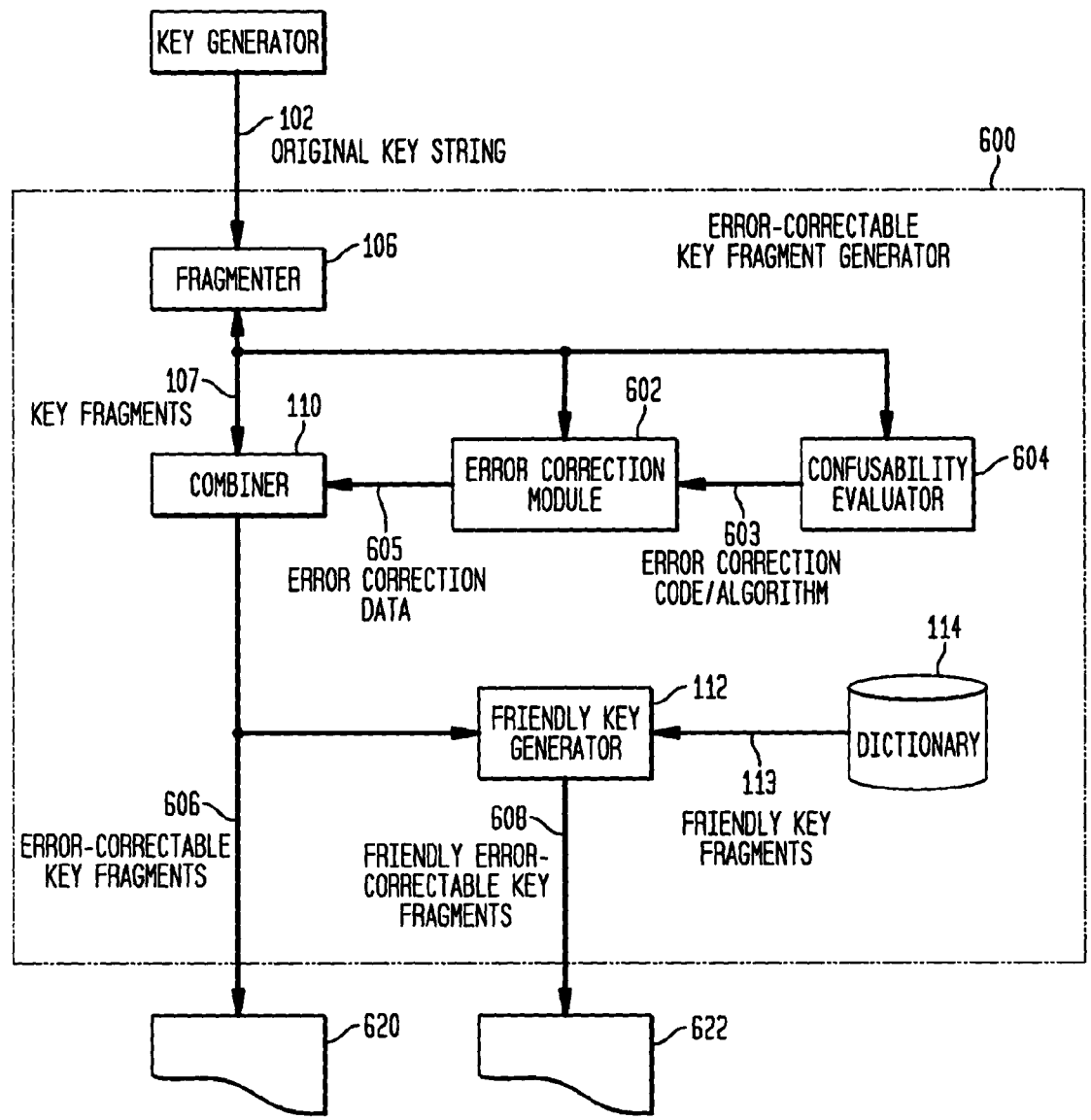
FIG. 6 is a block diagram of an error-correctable key fragment generator in accordance with one aspect of the present invention.

FIG. 6 is a block diagram of an exemplary error-correctable key fragment generator in accordance with one aspect of the present invention. Error-correctable key fragment generator 600 is similar to error-detectable key fragment generator 100 (FIG. 1) described above. In the embodiment shown in FIG. 6 check data generator 108 is replaced with error correction logic 602 and an optional confusability evaluator 604, both of which are be described below. Error-correctable key fragment generator 600 is shown producing two human-readable outputs: a plurality of error-correctable key fragments 606 and a plurality of friendly error-correctable key fragments 608, although embodiments can produce one or both of these outputs. These outputs are also described below. The functions and operations of error-correctable key fragment generator 600 is next described with reference to FIGS. 8 and 9.

Figure 8:
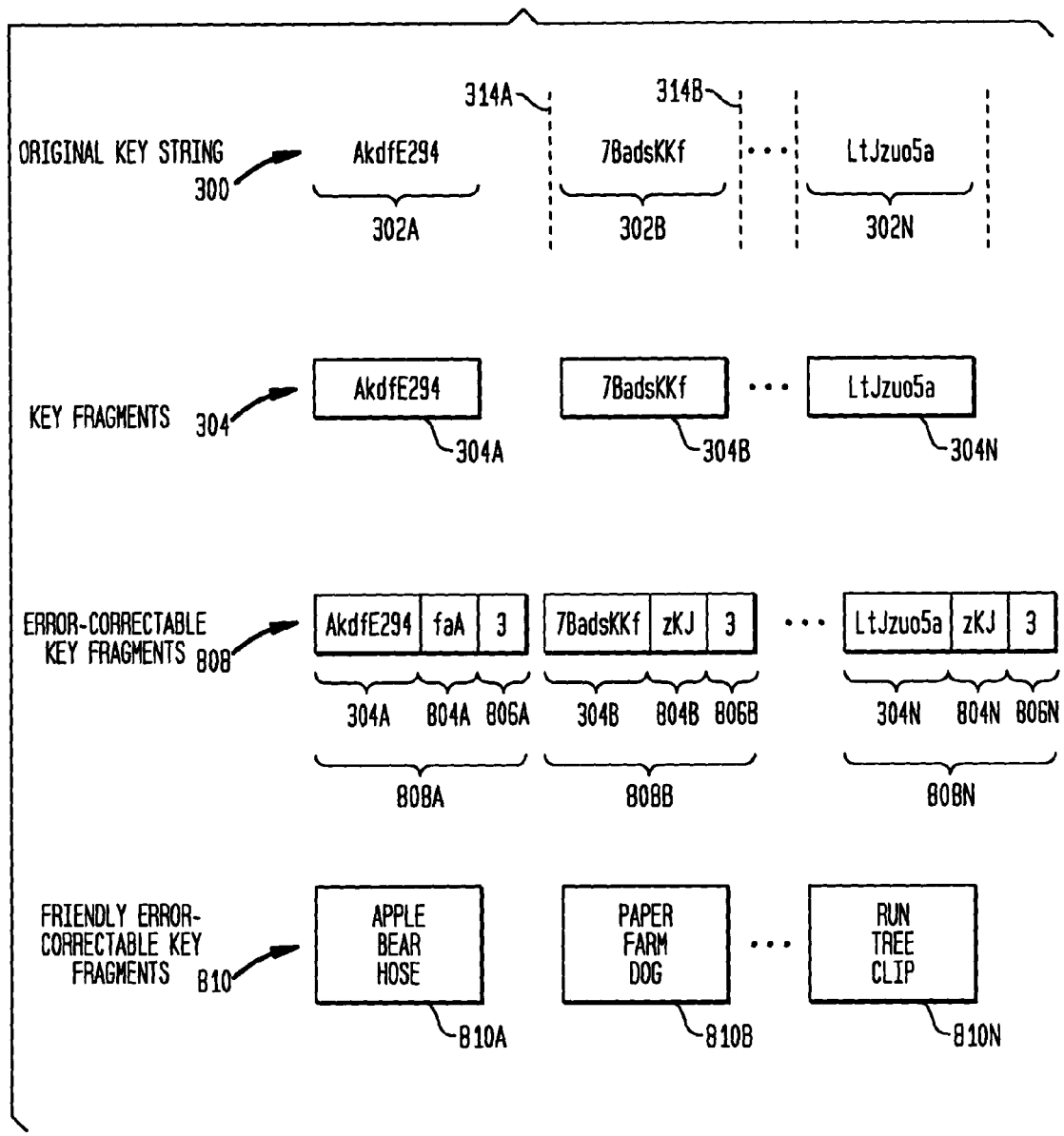
FIG. 8 is a diagram showing how an exemplary key string can be segmented into a plurality of error-correctable key fragments in accordance with one embodiment of the present invention.
Figure 9:
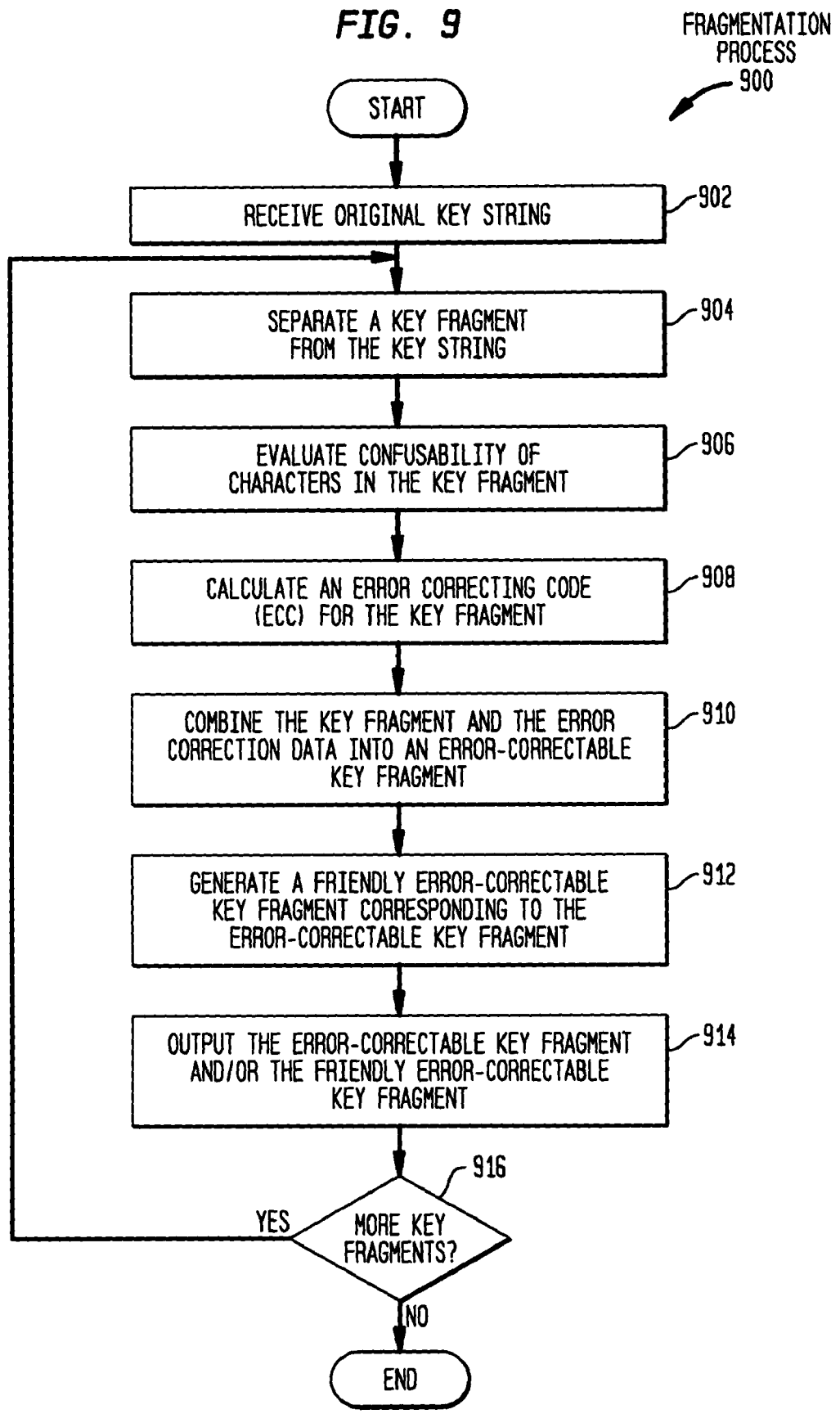
FIG. 9 is a flowchart of the operations performed by one embodiment of an error-correctable key fragmenter to segment a key string into a plurality of error-correctable key fragments.

FIG. 8 shows an exemplary key string fragmentation to generate error-correctable key fragments. FIG. 9 is a flowchart illustrating exemplary steps that can be performed by error-correctable key fragment generator 600 to segment an original key string 102 into a plurality of error-correctable key fragments 606 or a plurality of friendly error-correctable key fragments 608. It should be appreciated that fragmentation process 900 is one exemplary process; the present invention is not limited to this exemplary series of steps, individual steps or the sequence in which the steps are presented herein.

At block 902, an original key string 102 is received, for example, from a key generator 104. Key fragment generator 600 receives original license key string 102 and generates error-correctable key fragments 606 and/or friendly error-correctable key fragments 608. Original license key string 102 can be received from any number of sources, as is well known in the art. In the embodiment illustrated in FIG. 6, key fragment generator 600 is shown communicably coupled to a key generator 104 that generates original key string 102. As with key fragment generator 100 described above with respect to FIG. 1, key generator 104 can be connected to error-correctable key fragment generator 600 by a hardware or software connection, via an application programming interface ("API"), computer-readable medium and the like. In the fragmentation example illustrated in FIG. 8, an exemplary original key string 102, referred to as original key string 300, is shown. Original key string 300 is introduced above with reference to FIG. 3.

At block 904 original key string 102 is segmented into key fragments 107 and the first key fragment is separated from original key string 102. In the embodiment shown in FIG. 6, a fragmenter 106 fragments original key string 102. Fragmenter 106 is described above with reference to FIG. 1. As shown by dash lines 314A-314N in FIG. 8, original key string 300 is segmented into shorter substrings 302A, 302B, . . . 302N. Key fragments 304A, 304B, . . . 304N are produced from substrings 302A, 302B, . . . 302N, respectively, as shown in FIG. 8. As noted above, the length of the segmented strings (302 in FIG. 8) is selected such that the corresponding key fragment 107 (304 in the example of FIG. 8) is short enough for a human to remember. In the example key fragmentation illustrated in FIG. 8, key fragments 304 are segmented from original key string 300 in contiguous portions. As one of ordinary skill in the art would appreciate, however, original key string 102 can be fragmented in other ways.

At block 906, a confusability evaluator 604 of generator 600 evaluates the confusability of the characters in key fragments 107 for the purpose of selecting an appropriate error-correcting algorithm. This evaluation can include scanning key fragment 107 for characters that, during entry, a user is likely to confuse with other characters in original key string 102. For example if key fragment 107 contains a combination of upper and lower case letters "O" and "o" and/or digit zeros ("0"), the key fragment can be considered more confusable than other key fragments. The confusability can depend on the number of such confusable characters in key fragment 107. Confusability evaluator 604 can, therefore, select an error correcting code (ECC) algorithm 603 that is likely to be able to detect and correct data entry errors involving the incorrect entry of some or all of these confusable characters.

Error correcting codes (ECC) and ECC algorithms are well known. They can be used to augment data with error correcting codes that enable errors to be subsequently detected and corrected. The extent to which errors can be corrected depends on the ECC algorithm used and the amount of error correcting data provided.

At block 908, error correction module 602 calculates error-correcting data 605 for each key fragment 107. If the optional confusability evaluator 604 is not implemented in error-correctable key fragment generator 600, then a predetermined ECC algorithm is used in error correction module 602. Otherwise, the ECC algorithm selected by confusability evaluator 604 is used. Error-correcting data 605 can be used later to identify and correct erroneously entered key fragments, within the limits imposed by the ECC algorithm and the amount of error-correcting data included with the key fragment.

At block 910, combiner 110 combines key fragment 107 and the calculated error-correcting data 605 to produce error-correctable key fragment 606. If the optional confusability evaluator 604 is implemented, error-correcting data 605 includes an ECC identifier indicating which ECC algorithm was used. This identifier will, in turn, be included in error-correctable key fragment 606. The ECC identifier will enable an error-correctable key defragmenter (described below) to use an appropriate ECC algorithm to process this key fragment. Note that different ECC algorithms can be used for each key fragment 107.

As with check data 109 described above with reference to FIG. 1, in this embodiment error-correcting data 605 can be combined in any way with key fragment 107 to form error-correctable key fragment 606. Referring to the example illustrated in FIG. 8, error correction module 602 receives a key fragment 304 such as key fragment 304B "7BadsKKf," and generates error correcting data 605. In this example, error correcting data 605 comprises ECC 804B "2Kj" and identifier 806B "3." In this illustrative example, combiner 110 concatenate key fragments 304 and corresponding error correction data 804, 806 to form error-correctable key fragments 802. For example, combiner 110 combines key fragment 304B "7BadsKKf" with check data 804B "2Kj" and 806B "3" to form error-correctable key fragment 802B of "7BadsKKf2Kj3."

Optionally, at block 912, friendly key generator 112 generates a friendly key fragment 608 corresponding to error-correctable key fragment 606. Friendly key generator 112 is described in detail above with reference to FIG. 1. As with the embodiment shown in FIG. 1, friendly key generator 112 executes an algorithm or accesses a dictionary 114 containing, for example, a plurality of words which serve as friendly key fragments 113. Other embodiments as described above can also be implemented. For example, in one embodiment, friendly key generator 112 may generate or look-up one or more partial friendly key fragments. The one or more partial friendly key fragments may be based on, or generated from, key fragments 107 or error correction data 605. In these embodiments, the one or more partial friendly key fragments may be utilized along with error-correctable key fragments 606 to form friendly error-correctable key fragments 608. In the example illustrated in FIG. 3, exemplary friendly error-correctable key fragments 608 are shown as key fragments 810. The friendly key fragments 810A generated, for example, for error-correctable key fragment 808A "AkdfE294faA3" are "apple," "bear," and "house." It is anticipated that such key fragments 810A can be more accurately entered by a user as compared with key fragment 808A "AkdfE294faA3."

At block 914, error-correctable key fragment generator 600 outputs error-correctable key fragment 606 and/or friendly error-correctable key fragment 608. At block 916, error-correctable key fragment generator 600 ascertains whether there are more key fragments 107 to be processed. If there are more key fragments 107 to process, error-correctable key fragment generator 600 control returns to block 904 and the above steps are repeated. Otherwise, fragmentation process 600 finishes its operations at block 918. Upon completing its operations, error-correctable key fragment generator 600 has generated a plurality of error-correctable key fragments 606 or a plurality of friendly error-correctable key fragments 608 in human-readable form.

Figure 7:
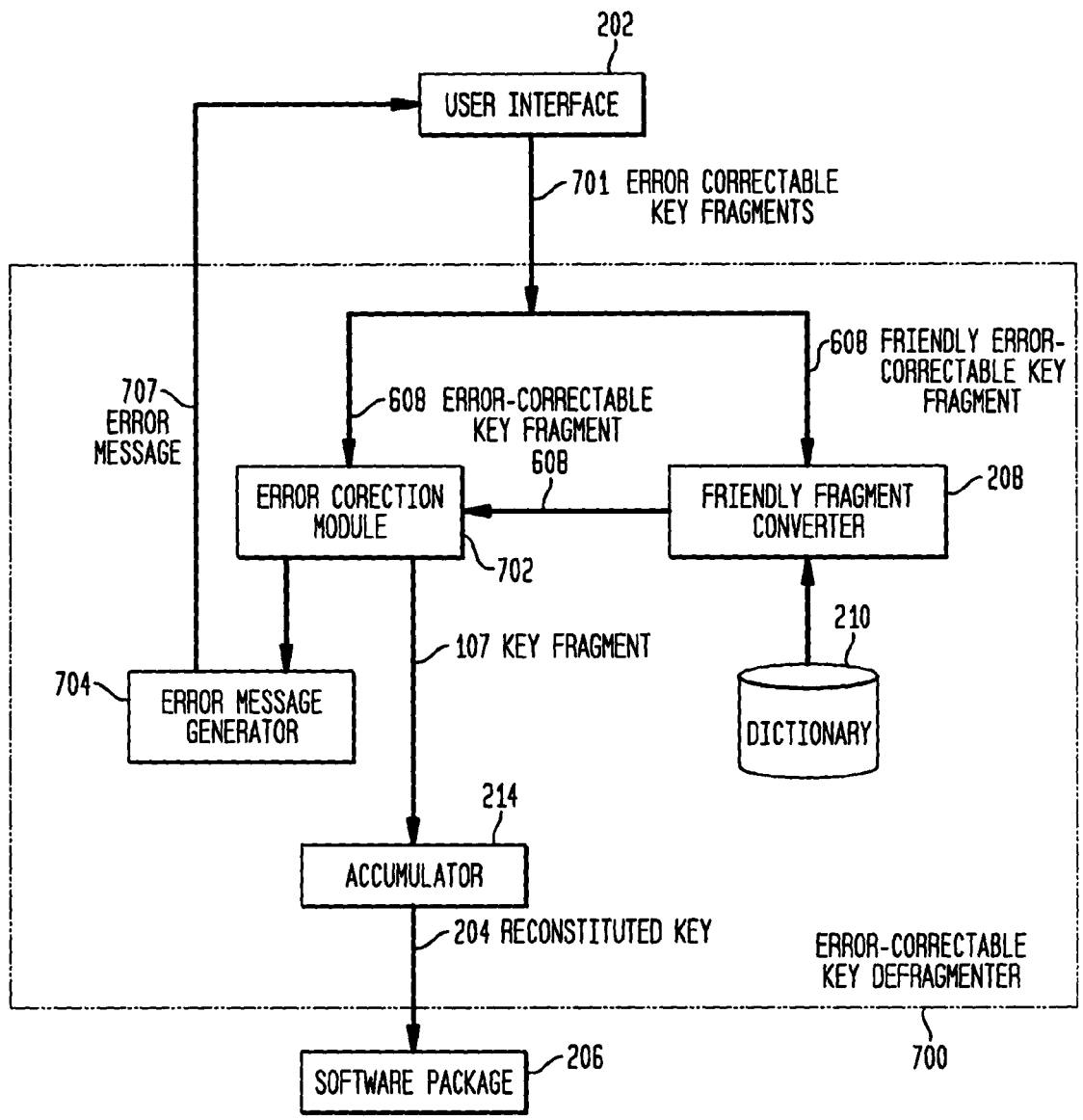
FIG. 7 is a block diagram of an exemplary error-correctable key defragmenter in accordance with one embodiment of the present invention.

FIG. 7 is a block diagram of an exemplary error-correctable key defragmenter 700 in accordance with one embodiment of the present invention. Error-correctable key defragmenter 700 is similar to error-detectable key defragmenter 200 (FIG.

2) described above. In the embodiment shown in FIG. 7, error checker 212 is replaced with error correction module 702 and a error message generator 704, both of which are be described below. Error-correctable key defragmenter 700 is shown receiving key fragments 251 from a user interface 202 and generating a reconstituted key 204. The functions and operations of error-correctable key defragmenter 700 are next described with reference to FIGS. 8 and 10.

Figure 10:
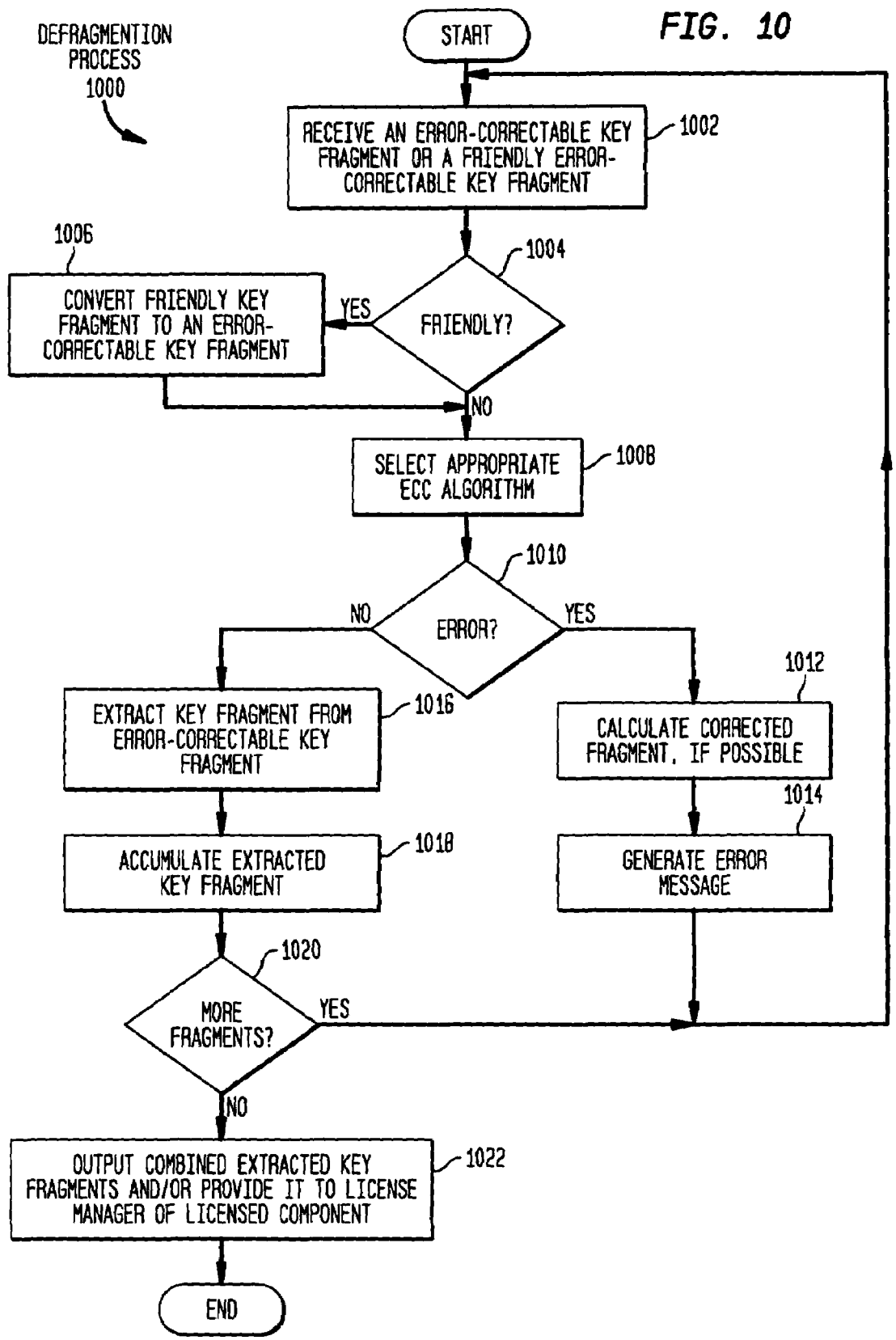
FIG. 10 is a flowchart of the operations performed by one embodiment of an error-correctable key defragmenter to combine a plurality of error-correctable key fragments into a reconstituted key string.

FIG. 10 is a flowchart 1000 of the steps performed by one embodiment of the exemplary error-correctable defragmenter 700 (FIG. 7) to combine a plurality of error-correctable key fragments into a reconstituted key string 204. At block 1002, error-correctable key defragmenter 700 receives a key fragment 701. Key defragmenter 700 receives key fragment 701 through a user interface 202, described above. Inputted key fragment 701 is determined, at block 1004, to be either an error-correctable key fragment 606 or a friendly error-correctable key fragment 608. If it is the latter, control passes to block 1006; if it is the former, control passes to block 1008. In FIG. 7, inputted error-correctable key fragments 701 are shown as being either error-correctable key fragment 606 provided to error correction module 702 (described below), or friendly error-correctable key fragment 608, provided to friendly fragment converter 208 (described above). In the example shown in FIG. 8, inputted key string 701 could be either the exemplary error-correctable key fragments 808 or the exemplary friendly error-correctable key fragments 810.

At block 1006, friendly fragment converter 208 converts the inputted friendly error-correctable key fragment 608 into error-correctable key fragment 606. Converter 208 references dictionary 210 or implements an appropriate algorithm to reverse the process friendly key generator 112 used to process friendly key fragments 608. In the example shown in FIG. 8, friendly error-correctable key fragments 810A of "apple," "bear," and "house" are converted by friendly fragment converter 208 to error-correctable key fragment 808A of "AkdfE29faA3."

In certain embodiments, as noted above, friendly error-correctable key fragments 606 may be formed by friendly key generator 112 based on one or more partial friendly key fragments and error-correctable key fragments 606 to form friendly error-detectable key fragments 118. In these embodiments, friendly fragment converter 208 reverses the process performed by friendly key generator 208 by extracting error-correctable key fragments 606 from friendly error-correctable key fragments 608.

At block 1008, an appropriate ECC algorithm is selected. If error-correctable key fragment 606 includes an indication 806 of which ECC algorithm was used, such identifier is then used to this select the appropriate ECC algorithm. Alternatively, the appropriate ECC algorithm can be ascertained by analyzing error-correctable key fragment 606, such as by checking its length. Otherwise, a predetermined ECC algorithm is used.

As shown in FIG. 7, regardless of whether inputted key fragment 251 is an error-correctable key fragment 606 or a friendly error-correctable key fragment 608, error correction module 702 receives an error-detectable key fragment 606. At block 1010, the selected ECC algorithm is used by error correction module 702 to determine whether there is an error in error-correctable key fragment 606. Specifically, error correction data 605 which was combined with a corresponding key fragments 107 (FIG. 6) is utilized to determine whether received key fragment 701 is without error. In the example shown in FIG. 8, error correction module 702 uses, for example, check data 804A of "faA" extracted from error-correctable key fragment 808A of "AkdfE29faA3" to ascertain whether key fragment 304A of "AkdfE29u" was entered correctly.

If key fragment 251 was not entered correctly, then an error message is generated at block 1014. Depending on the amount of error correction that was performed at block 1012, error message generator 704 can compare the erroneously entered key fragment to the corrected key fragment and ascertain the nature of the error. For example, if a digit zero ("0") was entered instead of an upper case letter "O", the hint can so indicate, without necessarily indicating the exact position of the error. For example, the error message could be, "Check for confusion between letter "O" and digit zero ("0")." Control then passes back to block 1002 to give the user an opportunity to enter the key fragment correctly.

If key fragment 251 was entered correctly, at block 1016, error correction module 702 extracts key fragment 701 from error-correctable key fragment 606 and provides it to accumulator 214. In the example shown in FIG. 8, key fragment 304A of "AkdfE29u" is extracted from error-correctable key fragments 808A of "AkdfE29faA3" and provided to accumulator 214. Accumulator 214 is described above.

At block 1018, accumulator 214 combines key fragment 107 with any previously extracted key fragment. Eventually, all extracted key fragments will be combined to form reconstituted key string 204. In the example shown in FIG. 8, key fragments 304 are accumulated to form original key string 300.

At block 1020, it is determined whether more key fragments 251 are to be received. If so, control returns to block 1002 and the above operations are repeated. Otherwise, control passes to block 1022, where key defragmenter 700 outputs reconstituted key string 204 to, for example, a software package 206. Alternatively, software package 206 can include an application programming interface (API) for the purpose of accepting a key string. Thus, key defragmenter 200 combines a plurality of entered error-correctable key fragments 606 or a plurality of friendly error-correctable key fragments 608 into a reconstituted key string 204.

The key fragment generators and key defragmenters of the present invention are preferably implemented in software or firmware that can be stored in a memory, and control operation of, a computer, such as a personal computer or a microprocessor embedded in another system. The memory can, but need not, be part of an integrated circuit that includes the microprocessor. The software or firmware can be stored on a removable or fixed computer-readable medium, such as a CD-ROM, CD-RW, DVD-ROM, DVD-RW, ZIP disk, hard disk or floppy disk. In addition, this software or firmware can be transmitted over a wireless or wired communication link, such as a computer or telephone network. Alternatively, the key fragment generators and key defragmenters can be implemented in hardware, such as an application-specific integrated circuit (ASIC) or a field-programmable gate array (FPGA).

For purposes of providing an example, the present invention has been described in the context of key strings used to license software packages. One of ordinary skill in the art can, however, apply the teachings herein to other licensing situations. For example, so-called "blade" systems include printed circuits ("blades") that contain many electronic components, often including a complete computer, including memory, on a single board. Sometimes computer blades include more than one processor. On some blades, individual components, such as the processors, or portions thereof, such as portions of the memory, are separately licensed for use. In these cases, a control circuit, typically a dedicated integrated circuit, on the blade controls use of the licensed capabilities by selectively enabling or disabling these components or portions or other capabilities of the blade (collectively "capabilities").

The terms and expressions employed herein are used as terms of description, not of limitation. There is no intention, in using these terms and expressions, to exclude any equivalents of the features shown or described or portions thereof. Practitioners in the art will recognize that other modifications are possible within the scope of the invention claimed.

What is claimed is:

1. A method for using a plurality of error-detectable key fragments of an original license key string for authorizing use of software, comprising:
   fragmenting the original key string into a plurality of key fragments;
   calculating for each key fragment corresponding check data;
   combining each key fragment with its corresponding check data to form said error-detectable key fragments;
   at least one of calculating and retrieving from a dictionary one or more partial friendly key fragment for each of said error-detectable key fragments;
   generating friendly error-detectable key fragments from said one or more partial friendly key fragments and said error-detectable key fragments.

2. The method of claim 1, further comprising:
   receiving a plurality of user-entered key fragments;
   using corresponding check data of said received key fragments to detect whether said received key fragments were entered correctly; and
   generating an error message when a received key fragment is inaccurate.

3. The method of claim 1, further comprising:
   receiving a plurality of user-entered key fragments;
   using corresponding check data of said received key fragments to detect whether said received key fragments were entered correctly; and
   defragmenting key data of said received key fragments into a reconstituted key string that is the same as the original key string.

4. The method of claim 3, wherein said defragmenting of said key data is performed when all received key fragments are entered correctly.

5. The method of claim 4, further comprising:
   providing the reconstituted key string to a software package to enable use of the software package.

6. The method of claim 4, further comprising:
   providing the reconstituted key string to a hardware component to enable use of the hardware component or a portion thereof.

7. The method of claim 1, wherein receiving the key string comprises:
   receiving the key string in computer-readable form from a key generator.

8. The method of claim 1, further comprising:
   providing said friendly error-detectable key fragments in human-readable form.

9. The method of claim 1, wherein each said friendly error-detectable key fragment comprises at least one word.

10. The method of claim 1, wherein each said friendly error-detectable key fragment is longer than said corresponding key fragment.

11. The method of claim 1, wherein combining a key fragment with its corresponding check data to form a friendly error-detectable key fragment further comprises:
    using at least a portion of one of either said key fragment or said check data to index and select data from said dictionary to form at least a portion of said friendly error-detectable key fragment.

12. A method for using a plurality of friendly error-detectable key fragments of an original license key string for authorizing use of software, comprising:
    fragmenting the original key string into a plurality of key fragments;
    calculating for each key fragment corresponding check data; and
    combining each key fragment with its corresponding check data to form said friendly error-detectable key fragments, wherein combining each key fragment with its corresponding check data to form friendly error-detectable key fragments further comprises:
      generating a first partial friendly error-detectable key fragment from said key fragment;
      generating a second partial friendly error-detectable key fragment from said corresponding check data; and
      generating said friendly error-detectable key fragment from said first partial friendly error-detectable key fragment and said second partial friendly error-detectable key fragment.

13. A method of segmenting a license key string for authorizing use of software into a plurality of error-correctable key fragments, comprising:
    fragmenting the key string into a plurality of key fragments;
    calculating for each key fragment corresponding error-correction data;
    combining each key fragment with said corresponding error-correction data to form a plurality of error-correctable key fragments;
    at least one of calculating and retrieving from a dictionary one or more partial friendly key fragment for each of said error-correctable key fragments; and
    generating friendly error-correctable key fragments from said one or more partial friendly key fragments and said error-correctable key fragments.

14. The method of claim 13, further comprising:
    providing said friendly error-correctable key fragments in human-readable form.

15. The method of claim 13, further comprising:
    receiving a plurality of user-entered friendly error-correctable key fragments;
    identifying errors in each received friendly error-correctable key fragment using corresponding error-correction data in the received friendly error-correctable key fragments; and
    defragmenting key data of the received error-correctable key fragments into a reconstituted key string that is the same as the original license key string.

16. The method of claim 15, further comprising:
    generating an error message indicating said identified errors in each received friendly error-correctable key fragment.

17. The method of claim 15, wherein generating an error message comprises:
    generating an error message that identifies one or more portions of said received error-correctable key fragment that was entered incorrectly.

18. The method of claim 15, further comprising:
    providing the reconstituted key string to a software package to enable use of the software package.

19. The method of claim 15, further comprising:
providing the reconstituted key string to a hardware component to enable use of the hardware component or a portion thereof.

20. The method of claim 13, further comprising:
receiving the original key string in computer-readable form from a key generator.

21. The method of claim 13, wherein each friendly error-correctable key fragment comprises at least one word.

22. The method of claim 13, wherein each friendly error-correctable key fragment comprises a greater number of characters than said corresponding key fragment.

23. The method of claim 13, wherein combining each key fragment with its corresponding check data to form a friendly error-correctable key fragment comprises:
using at least a portion of one of either said key fragment or said error correction data to index and select data from a dictionary to form at least a portion of said friendly error-correctable key fragment.

24. The method of claim 13, further comprising:
receiving a plurality of entered friendly error-correctable key fragments each comprising key data and corresponding error correction data;
using said error correction data to detect errors in said corresponding key data; and
generating an error message identifying said detected errors.

25. The method of claim 13, further comprising:
receiving a plurality of entered friendly error-correctable key fragments each comprising key data and error correction data;
using error correction data to detect errors in said corresponding key data; and
defragmenting correct friendly error-correctable key fragments to form a reconstituted license key string.

26. An article of manufacture, comprising:
a computer-readable medium storing computer-executable instructions capable of segmenting a key string for authorizing use of software into a plurality of friendly error-detectable key fragments, comprising:
fragmenting the original key string into a plurality of key fragments;
calculating for each key fragment corresponding check data;
combining each key fragment with its corresponding check data to form error-detectable key fragments;
at least one of calculating and retrieving from a dictionary one or more partial friendly key fragments for each of said error-detectable key fragments; and
generating said friendly error-detectable key fragments from said one or more partial friendly error-detectable key fragments and said error-detectable fragments.

27. The article of manufacture of claim 26, further comprising:
receiving a plurality of user-entered key fragments;
using corresponding check data of said received key fragments to detect whether said received key fragments were entered correctly; and
generating an error message when a received key fragment is inaccurate.

28. The article of manufacture of claim 26, further comprising:
receiving a plurality of user-entered key fragments;
using corresponding check data of said received key fragments to detect whether said received key fragments were entered correctly; and
defragmenting key data of said received key fragments into a reconstituted key string that is the same as the original key string.

29. The article of manufacture of claim 28, further comprising:
providing the reconstituted key string to a software package to enable use of the software package.

30. The article of manufacture of claim 28, further comprising:
providing the reconstituted key string to a hardware component to enable use of the hardware component or a portion thereof.

31. The article of manufacture of claim 26, wherein each friendly error-detectable key fragment comprises at least one word.

32. An article of manufacture, comprising:
a computer-readable medium storing computer-executable instructions capable of segmenting a key string for authorizing use of software into a plurality of friendly error-correctable key fragments, comprising:
fragmenting the key string into a plurality of key fragments;
calculating for each key fragment corresponding error-correction data;
combining each key fragment with said corresponding error-correction data to form a plurality of error-correctable key fragments, wherein said error-correction data permits the identification of errors in said error-correctable key fragments;
at least one of calculating and retrieving from a dictionary one or more partial friendly key fragments for each of said error-correctable key fragments; and
generating said friendly error-correctable key fragments from said one or more partial friendly key fragments and said error-correctable key fragments.

33. The article of manufacture of claim 32, further comprising:
receiving a plurality of user-entered friendly error-correctable key fragments;
identifying errors in each received friendly error-correctable key fragment using corresponding error-correction data in said friendly received error-correctable key fragments; and
defragmenting key data of the received friendly error-correctable key fragments into a reconstituted key string that is the same as the original license key string.

34. The article of manufacture of claim 33, further comprising:
generating an error message indicating said identified errors in each received friendly error-correctable key fragments.

35. The article of manufacture of claim 33, wherein generating an error message comprises:
generating an error message that identifies one or more portions of said received friendly error-correctable key fragment that was entered incorrectly.

36. The article of manufacture of claim 33, further comprising:
providing the reconstituted key string to a software package to enable use of the software package.

37. The article of manufacture of claim 33, further comprising:
providing the reconstituted key string to a hardware component to enable use of the hardware component or a portion thereof.

38. The article of manufacture of claim 32, wherein combining each key fragment with its corresponding check data to form said friendly error-correctable key fragments comprises:

using at least a portion of one of either said key fragment or said error correction data to select data from a dictionary to form at least a portion of said friendly error-correctable key fragment.

39. The article of manufacture of claim 32, further comprising:

receiving a plurality of entered friendly error-correctable key fragments each comprising key data and corresponding error correction data;

using said error correction data to detect errors in said corresponding key data; and generating an error message identifying said detected errors.

40. The article of manufacture of claim 32, further comprising:

receiving a plurality of entered friendly error-correctable key fragments each comprising key data and error correction data;

using said error correction data to detect errors in said corresponding key data; and defragmenting said friendly error-correctable key fragments to form a reconstituted license key string.

41. A key fragment generator for segmenting a key string M authorizing use of software into a plurality of friendly error-detectable key fragments, comprising:

a key fragmenter adapted to input the key string and produce key fragments;

a check data generator configured to calculate check data corresponding to said key fragments, wherein said check data can be subsequently used to detect if said corresponding key fragment is entered incorrectly;

a combiner configured to combine said key fragments and said corresponding check data to provide error-detectable key fragments; and a friendly key-generator configured to at least one of calculate or retrieve from a dictionary one or more partial friendly key fragments, and to generate said friendly error-detectable key fragments from said one or more partial friendly key fragments and said error-detectable key fragments.

42. The key fragment generator of claim 41,
wherein said friendly error-detectable key fragments are words recognizable by humans.

43. A key defragmenter for combining a plurality of entered friendly error-detectable key fragments into a reconstituted key string for authorizing use of software, each friendly error-detectable key fragment comprising error-detectable key fragments, check data, key data and one or more partial friendly key fragments, the key defragmenter comprising:

a friendly fragment convertor configured to extract said error-detectable key fragments from said friendly error-detectable key fragments;

an error checker adapted to use said check data of at least one of said entered friendly error-detectable key fragments to detect if said entered friendly error-detectable key fragment is entered incorrectly;

an accumulator adapted to defragment said key data of said entered friendly error-detectable key fragments into the reconstituted key string and to provide the reconstituted key string.

44. A key defragmenter for combining a plurality of entered friendly key fragments formed from one or more partial key fragments and one or more error-detectable key fragments into a reconstituted key string for authorizing use of software, comprising:

a friendly fragment converter adapted to ascertain said error-detectable key fragments from which the entered friendly key fragment was calculated;

an error checker adapted to use check data of at least one of said error-detectable key fragments to detect if each said entered friendly error-detectable key fragment is entered incorrectly;

an accumulator adapted to defragment said ascertained key fragments into the reconstituted key string and to provide externally said reconstituted key string.

45. A key fragment generator for segmenting a key string for authorizing use of software into a plurality of friendly error-correctable key fragments, comprising:

a key fragmenter configured to fragment the original key string into a plurality of key fragments;

an error correction module configured to calculate error correction data corresponding to each key fragment, wherein error correction data can subsequently be used to determine the accuracy of said corresponding key data;

a combiner configured to combine each key fragments with its corresponding error correction data to provide error-correctable key fragments;

a dictionary configured to provide one or more partial friendly key fragments;

a friendly key generator configured to generate said friendly error-correctable key fragments from said one or more partial friendly key fragments and said error-correctable key fragments.

46. The key fragment generator of claim 45, further comprising:

a confusability evaluator configured to evaluate confusability of one or more of said key fragments and, based on the confusability, select an error correction algorithm from a plurality of error correction algorithms.

47. A licensing key defragmenter for combining a plurality of entered friendly error-correctable key fragments into a reconstituted key string for authorizing use of software, each error-correctable key fragment comprising one or more partial friendly key fragments, key data and error correction data, the key defragmenter comprising:

a friendly fragment converter configured to extract said error correction data from each said friendly error-correctable key fragments;

an error correction module configured to use said error correction data to identify a portion of each said entered friendly error-correctable key fragment that was entered incorrectly;

an accumulator adapted to defragment the key data of said entered friendly error-detectable key fragments into the reconstituted key string and to provide the reconstituted key string.

48. The method of claim 12, wherein each friendly error-detectable key fragment comprises at least one word.

49. The method of claim 12, wherein each friendly error-detectable key fragment is longer than the corresponding key fragment.

50. The method of claim 12, wherein combining each key fragment with its corresponding check data to form friendly error-detectable key fragments further comprises:

using at least a portion of one of either said key fragment or said check data to select data from a dictionary to form at least a portion of said friendly error-detectable key fragment.

* * * * *

UNITED STATES PATENT AND TRADEMARK OFFICE
CERTIFICATE OF CORRECTION

PATENT NO.       : 7,406,600 B2                                    Page 1 of 1
APPLICATION NO.  : 10/630144
DATED            : July 29, 2008
INVENTOR(S)      : William J. Thomas et al.

It is certified that error appears in the above-identified patent and that said Letters Patent is hereby corrected as shown below:

In column 7, line 63, after "214" delete "to".

Signed and Sealed this

Twenty-first Day of October, 2008

JON W. DUDAS
*Director of the United States Patent and Trademark Office*